(12) United States Patent
Gehrke et al.

(10) Patent No.: US 8,892,128 B2
(45) Date of Patent: Nov. 18, 2014

(54) LOCATION BASED GEO-REMINDERS

(75) Inventors: Todd Gehrke, Seattle, WA (US); Chih Wang, Shoreline, WA (US); Sarah Lawrence, Renton, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 708 days.

(21) Appl. No.: 12/588,331

(22) Filed: Oct. 13, 2009

(65) Prior Publication Data

US 2010/0093371 A1    Apr. 15, 2010

Related U.S. Application Data

(60) Provisional application No. 61/136,917, filed on Oct. 14, 2008.

(51) Int. Cl.
*H04W 24/00* (2009.01)
*H04W 4/02* (2009.01)
*H04L 29/08* (2006.01)

(52) U.S. Cl.
CPC *H04W 4/02* (2013.01); *H04L 67/18* (2013.01)
USPC ............... 455/456.3; 455/466; 455/414.3; 340/539.13

(58) Field of Classification Search
USPC ........ 455/466, 456.1–457, 414.1–414.3, 458, 455/567, 404.1–404.2
See application file for complete search history.

(56) References Cited

U.S. PATENT DOCUMENTS

| | | |
|---|---|---|
| 4,445,118 A | 4/1984 | Taylor |
| 4,928,107 A | 5/1990 | Kuroda |
| 4,972,484 A | 11/1990 | Theile |
| 5,126,722 A | 6/1992 | Kamis |
| 5,283,570 A | 2/1994 | DeLuca |
| 5,301,354 A | 4/1994 | Schwendeman |
| 5,311,516 A | 5/1994 | Kuznicki |
| 5,327,529 A | 7/1994 | Fults |
| 5,335,246 A | 8/1994 | Yokev |
| 5,351,235 A | 9/1994 | Lahtinen |
| 5,365,451 A | 11/1994 | Wang |
| 5,418,537 A | 5/1995 | Bird |
| 5,422,813 A | 6/1995 | Schuchman |
| 5,479,408 A | 12/1995 | Will |
| 5,485,163 A | 1/1996 | Singer et al. |
| 5,504,491 A | 4/1996 | Chapman |
| 5,506,886 A | 4/1996 | Maine |
| 5,517,199 A | 5/1996 | DiMattei |
| 5,530,655 A | 6/1996 | Lokhoff |

(Continued)

OTHER PUBLICATIONS

Internal Search Report received in PCT/US2009/05575 dated Dec. 3, 2009.

(Continued)

*Primary Examiner* — Sharad Rampuria
(74) *Attorney, Agent, or Firm* — William H. Bollman

(57) ABSTRACT

Location based geo-reminding system retrieves, from a location based geo-reminder physical server, a current location of wireless client devices within a given area. The method accesses, from the location based geo-reminder physical server, a physical location based geo-reminder database comprising an identity of a trigger identifier and a limits of trigger identifier. Transmission of a location based geo-reminder message is initiated if the current location of a particular wireless client device is within a limits of restriction distance from a location of the identity of the trigger.

8 Claims, 4 Drawing Sheets

(56) References Cited

U.S. PATENT DOCUMENTS

| | | | |
|---|---|---|---|
| 5,530,914 A | 6/1996 | McPheters | |
| 5,539,395 A | 7/1996 | Buss | |
| 5,539,829 A | 7/1996 | Lokhoff | |
| 5,546,445 A | 8/1996 | Dennison | |
| 5,568,153 A | 10/1996 | Beliveau | |
| 5,583,774 A | 12/1996 | Diesel | |
| 5,594,780 A | 1/1997 | Wiedeman | |
| 5,606,618 A | 2/1997 | Lokhoff | |
| 5,629,693 A | 5/1997 | Janky | |
| 5,633,630 A | 5/1997 | Park | |
| 5,636,276 A | 6/1997 | Brugger | |
| 5,661,652 A | 8/1997 | Sprague | |
| 5,661,755 A | 8/1997 | Van de Kerkhof | |
| 5,689,245 A | 11/1997 | Noreen | |
| 5,699,053 A | 12/1997 | Jonsson | |
| 5,704,029 A | 12/1997 | Wright, Jr. | |
| 5,721,781 A | 2/1998 | Deo | |
| 5,731,785 A | 3/1998 | Lemelson | |
| 5,765,152 A | 6/1998 | Erickson | |
| 5,771,353 A | 6/1998 | Eggleston | |
| 5,774,670 A | 6/1998 | Montulli | |
| 5,809,415 A | 9/1998 | Rossman | |
| 5,812,086 A | 9/1998 | Bertiger | |
| 5,812,087 A | 9/1998 | Krasner | |
| 5,841,396 A | 11/1998 | Krasner | |
| 5,857,201 A | 1/1999 | Wright, Jr. | |
| 5,864,667 A | 1/1999 | Barkam | |
| 5,874,914 A | 2/1999 | Krasner | |
| 5,896,369 A | 4/1999 | Warsta | |
| 5,898,391 A | 4/1999 | Jeffries | |
| 5,922,074 A | 7/1999 | Richard | |
| 5,930,250 A | 7/1999 | Klok | |
| 5,945,944 A | 8/1999 | Krasner | |
| 5,946,629 A | 8/1999 | Sawyer | |
| 5,950,137 A | 9/1999 | Kim | |
| 5,960,362 A | 9/1999 | Grob | |
| 5,983,099 A | 11/1999 | Yao | |
| 5,999,124 A | 12/1999 | Sheynblat | |
| 6,032,051 A | 2/2000 | Hall | |
| 6,052,081 A | 4/2000 | Krasner | |
| 6,058,338 A | 5/2000 | Agashe | |
| 6,061,018 A | 5/2000 | Sheynblat | |
| 6,064,336 A | 5/2000 | Krasner | |
| 6,067,045 A | 5/2000 | Castelloe | |
| 6,081,229 A | 6/2000 | Soliman | |
| 6,085,320 A | 7/2000 | Kaliski, Jr. | |
| 6,091,956 A * | 7/2000 | Hollenberg | 455/456.5 |
| 6,118,403 A | 9/2000 | Lang | |
| 6,121,923 A | 9/2000 | King | |
| 6,124,810 A | 9/2000 | Segal | |
| 6,131,067 A | 10/2000 | Girerd | |
| 6,133,874 A | 10/2000 | Krasner | |
| 6,134,483 A | 10/2000 | Vayanos | |
| 6,147,598 A | 11/2000 | Murphy | |
| 6,150,980 A | 11/2000 | Krasner | |
| 6,154,172 A | 11/2000 | Piccionelli | |
| 6,169,901 B1 | 1/2001 | Boucher | |
| 6,169,902 B1 | 1/2001 | Kawamoto | |
| 6,178,506 B1 | 1/2001 | Quick, Jr. | |
| 6,185,427 B1 | 2/2001 | Krasner | |
| 6,188,354 B1 | 2/2001 | Soliman | |
| 6,188,909 B1 | 2/2001 | Alanara | |
| 6,189,098 B1 | 2/2001 | Kaliski, Jr. | |
| 6,195,557 B1 | 2/2001 | Havinis | |
| 6,204,798 B1 | 3/2001 | Fleming | |
| 6,205,330 B1 | 3/2001 | Winbladh | |
| 6,208,290 B1 | 3/2001 | Krasner | |
| 6,215,441 B1 | 4/2001 | Moeglein | |
| 6,239,742 B1 | 5/2001 | Krasner | |
| 6,247,135 B1 | 6/2001 | Feague | |
| 6,249,873 B1 | 6/2001 | Richard | |
| 6,252,544 B1 | 6/2001 | Hoffberg | |
| 6,253,203 B1 | 6/2001 | O'Flaherty | |
| 6,260,147 B1 | 7/2001 | Quick, Jr. | |
| 6,275,692 B1 | 8/2001 | Skog | |
| 6,275,849 B1 | 8/2001 | Ludwig | |
| 6,297,768 B1 | 10/2001 | Allen, Jr. | |
| 6,307,504 B1 | 10/2001 | Sheynblat | |
| 6,308,269 B2 | 10/2001 | Proidl | |
| 6,313,786 B1 | 11/2001 | Sheynblat | |
| 6,321,257 B1 | 11/2001 | Kotola | |
| 6,324,524 B1 | 11/2001 | Lent | |
| 6,327,473 B1 | 12/2001 | Soliman | |
| 6,333,919 B2 | 12/2001 | Gaffney | |
| 6,360,093 B1 | 3/2002 | Ross | |
| 6,360,102 B1 | 3/2002 | Havinis | |
| 6,363,254 B1 | 3/2002 | Jones | |
| 6,367,019 B1 | 4/2002 | Ansell | |
| 6,377,209 B1 | 4/2002 | Krasner | |
| 6,400,304 B1 | 6/2002 | Chubbs | |
| 6,400,314 B1 | 6/2002 | Krasner | |
| 6,400,958 B1 | 6/2002 | Isomursu | |
| 6,411,254 B1 | 6/2002 | Moeglein | |
| 6,421,002 B2 | 7/2002 | Krasner | |
| 6,429,812 B1 | 8/2002 | Hoffberg | |
| 6,430,504 B1 | 8/2002 | Gilbert | |
| 6,433,734 B1 | 8/2002 | Krasner | |
| 6,442,391 B1 | 8/2002 | Johansson | |
| 6,449,473 B1 | 9/2002 | Raivisto | |
| 6,449,476 B1 | 9/2002 | Hutchison, IV | |
| 6,456,852 B2 | 9/2002 | Bar | |
| 6,463,272 B1 | 10/2002 | Wallace | |
| 6,477,150 B1 | 11/2002 | Maggenti | |
| 6,504,491 B1 | 1/2003 | Christians | |
| 6,510,387 B2 | 1/2003 | Fuchs | |
| 6,512,922 B1 | 1/2003 | Burg | |
| 6,512,930 B2 | 1/2003 | Sandegren | |
| 6,515,623 B2 | 2/2003 | Johnson | |
| 6,519,466 B2 | 2/2003 | Pande | |
| 6,522,682 B1 | 2/2003 | Kohli | |
| 6,525,687 B2 | 2/2003 | Roy | |
| 6,525,688 B2 | 2/2003 | Chou | |
| 6,529,829 B2 | 3/2003 | Turetzky | |
| 6,531,982 B1 | 3/2003 | White | |
| 6,538,757 B1 | 3/2003 | Sansone | |
| 6,539,200 B1 | 3/2003 | Schiff | |
| 6,539,304 B1 | 3/2003 | Chansarkar | |
| 6,542,464 B1 | 4/2003 | Takeda | |
| 6,542,734 B1 | 4/2003 | Abrol | |
| 6,542,743 B1 | 4/2003 | Soliman | |
| 6,549,776 B1 | 4/2003 | Joong | |
| 6,549,844 B1 | 4/2003 | Egberts | |
| 6,556,832 B1 | 4/2003 | Soliman | |
| 6,560,461 B1 | 5/2003 | Fomukong | |
| 6,560,534 B2 | 5/2003 | Abraham | |
| 6,567,035 B1 | 5/2003 | Elliott | |
| 6,570,530 B2 | 5/2003 | Gaal | |
| 6,574,558 B2 | 6/2003 | Kohli | |
| 6,580,390 B1 | 6/2003 | Hay | |
| 6,584,552 B1 | 6/2003 | Kuno | |
| 6,594,500 B2 | 7/2003 | Bender | |
| 6,597,311 B2 | 7/2003 | Sheynblat | |
| 6,603,973 B1 | 8/2003 | Foladare | |
| 6,606,495 B1 | 8/2003 | Korpi | |
| 6,606,554 B2 | 8/2003 | Edge | |
| 6,609,004 B1 | 8/2003 | Morse | |
| 6,611,757 B2 | 8/2003 | Brodie | |
| 6,618,670 B1 | 9/2003 | Chansarkar | |
| 6,621,452 B2 | 9/2003 | Knockheart | |
| 6,628,233 B2 | 9/2003 | Knockheart | |
| 6,633,255 B2 | 10/2003 | Krasner | |
| 6,640,184 B1 | 10/2003 | Rabe | |
| 6,650,288 B1 | 11/2003 | Pitt et al. | |
| 6,661,372 B1 | 12/2003 | Girerd | |
| 6,665,539 B2 | 12/2003 | Sih | |
| 6,665,541 B1 | 12/2003 | Krasner | |
| 6,671,620 B1 | 12/2003 | Garin | |
| 6,677,894 B2 | 1/2004 | Sheynblat | |
| 6,680,694 B1 | 1/2004 | Knockheart | |
| 6,680,695 B2 | 1/2004 | Turetzky | |
| 6,687,504 B1 | 2/2004 | Raith | |
| 6,691,019 B2 | 2/2004 | Seeley | |
| 6,694,258 B2 | 2/2004 | Johnson | |
| 6,697,629 B1 | 2/2004 | Grilli | |

(56) References Cited

U.S. PATENT DOCUMENTS

| | | | |
|---|---|---|---|
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | van Diggelen |
| 6,704,651 B2 | 3/2004 | Van Diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynblat |
| 6,721,578 B2 | 4/2004 | Minear |
| 6,721,871 B2 | 4/2004 | Piispanen |
| 6,724,342 B2 | 4/2004 | Bloebaum |
| 6,725,159 B2 | 4/2004 | Krasner |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aguilon |
| 6,741,842 B2 | 5/2004 | Goldberg |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,544 B2 | 6/2004 | Rangarajan |
| 6,772,340 B1 | 8/2004 | Peinado |
| 6,775,655 B1 | 8/2004 | Peinado |
| 6,775,802 B2 | 8/2004 | Gaal |
| 6,778,136 B2 | 8/2004 | Gronemeyer |
| 6,778,885 B2 | 8/2004 | Agashe |
| 6,781,963 B2 | 8/2004 | Crockett |
| 6,788,249 B1 | 9/2004 | Farmer |
| 6,795,699 B1 | 9/2004 | McCraw |
| 6,799,050 B1 | 9/2004 | Krasner |
| 6,801,124 B2 | 10/2004 | Naitou |
| 6,801,159 B2 | 10/2004 | Swope |
| 6,804,524 B1 | 10/2004 | Vandermeijden |
| 6,807,534 B1 | 10/2004 | Erickson |
| 6,810,323 B1 | 10/2004 | Bullock |
| 6,813,560 B2 | 11/2004 | van Diggelen |
| 6,816,111 B2 | 11/2004 | Krasner |
| 6,816,710 B2 | 11/2004 | Krasner |
| 6,816,719 B1 | 11/2004 | Heinonen |
| 6,816,734 B2 | 11/2004 | Wong |
| 6,820,069 B1 | 11/2004 | Kogan |
| 6,829,475 B1 | 12/2004 | Lee |
| 6,832,373 B2 | 12/2004 | O'Neill |
| 6,833,785 B2 | 12/2004 | Brown |
| 6,839,020 B2 | 1/2005 | Geier |
| 6,839,021 B2 | 1/2005 | Sheynblat |
| 6,842,715 B1 | 1/2005 | Gaal |
| 6,853,849 B1 | 2/2005 | Tognazzini |
| 6,853,916 B2 | 2/2005 | Fuchs |
| 6,856,282 B2 | 2/2005 | Mauro |
| 6,859,722 B2 * | 2/2005 | Jones .................... 701/465 |
| 6,861,980 B1 | 3/2005 | Rowitch et al. |
| 6,865,171 B1 | 3/2005 | Nilsson |
| 6,865,395 B2 | 3/2005 | Riley |
| 6,867,734 B2 | 3/2005 | Voor et al. |
| 6,873,854 B2 | 3/2005 | Crockett et al. |
| 6,885,940 B2 | 4/2005 | Brodie et al. |
| 6,888,497 B2 | 5/2005 | King et al. |
| 6,888,932 B2 | 5/2005 | Snip et al. |
| 6,895,238 B2 | 5/2005 | Newell et al. |
| 6,895,249 B2 | 5/2005 | Gaal |
| 6,895,324 B2 | 5/2005 | Straub |
| 6,900,758 B1 | 5/2005 | Mann et al. |
| 6,903,684 B1 | 6/2005 | Simic et al. |
| 6,904,029 B2 | 6/2005 | Fors |
| 6,907,224 B2 | 6/2005 | Younis |
| 6,907,238 B2 | 6/2005 | Leung |
| 6,912,395 B2 | 6/2005 | Benes |
| 6,915,208 B2 | 7/2005 | Garin |
| 6,917,331 B2 | 7/2005 | Gronemeyer |
| 6,930,634 B2 | 8/2005 | Peng |
| 6,937,187 B2 | 8/2005 | Van Diggelen |
| 6,937,872 B2 | 8/2005 | Krasner |
| 6,941,144 B2 | 9/2005 | Stein |
| 6,944,540 B2 | 9/2005 | King |
| 6,947,772 B2 | 9/2005 | Minear |
| 6,950,058 B1 | 9/2005 | Davis |
| 6,956,467 B1 | 10/2005 | Mercado, Jr. |
| 6,957,073 B2 | 10/2005 | Bye |
| 6,961,562 B2 | 11/2005 | Ross |
| 6,965,754 B2 | 11/2005 | King |
| 6,965,767 B2 | 11/2005 | Maggenti |
| 6,970,917 B1 | 11/2005 | Kushwaha |
| 6,973,166 B1 | 12/2005 | Tsumpes |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohles |
| 6,985,105 B1 | 1/2006 | Pitt et al. |
| 6,985,747 B2 * | 1/2006 | Chithambaram .......... 455/456.5 |
| 6,996,720 B1 | 2/2006 | DeMello |
| 6,999,782 B2 | 2/2006 | Shaughnessy |
| 7,024,321 B1 | 4/2006 | Deninger |
| 7,024,393 B1 | 4/2006 | Peinado |
| 7,047,411 B1 | 5/2006 | DeMello |
| 7,064,656 B2 | 6/2006 | Belcher |
| 7,065,351 B2 | 6/2006 | Carter |
| 7,065,507 B2 | 6/2006 | Mohammed |
| 7,071,814 B1 | 7/2006 | Schorman |
| 7,079,857 B2 | 7/2006 | Maggenti |
| 7,082,365 B2 * | 7/2006 | Sheha et al. ................... 701/426 |
| 7,103,018 B1 | 9/2006 | Hasen |
| 7,103,574 B1 | 9/2006 | Peinado |
| 7,106,717 B2 | 9/2006 | Rosseau |
| 7,130,644 B2 * | 10/2006 | Kuwahra et al. ........... 455/456.3 |
| 7,136,838 B1 | 11/2006 | Peinado |
| 7,151,946 B2 | 12/2006 | Magennti |
| 7,177,623 B2 | 2/2007 | Baldwin |
| 7,209,969 B2 | 4/2007 | Lahti |
| 7,218,940 B2 | 5/2007 | Niemenna |
| 7,221,959 B2 | 5/2007 | Lindquist |
| 7,301,494 B2 | 11/2007 | Waters |
| 7,471,236 B1 | 12/2008 | Pitt |
| 7,504,983 B2 | 3/2009 | Chen |
| 7,565,132 B2 * | 7/2009 | Ben Ayed ................... 455/456.3 |
| 7,577,522 B2 * | 8/2009 | Rosenberg .................... 701/433 |
| 7,583,972 B2 * | 9/2009 | Clipsham ...................... 455/457 |
| 7,764,219 B2 | 7/2010 | Pitt |
| 7,848,765 B2 * | 12/2010 | Phillips et al. ............. 455/456.3 |
| 8,000,726 B2 * | 8/2011 | Altman et al. ............. 455/456.3 |
| 8,065,079 B2 * | 11/2011 | Rogers ........................ 701/516 |
| 8,170,580 B2 * | 5/2012 | Dingler et al. ............. 455/456.1 |
| 8,307,029 B2 * | 11/2012 | Davis et al. .................... 709/203 |
| 8,396,490 B2 * | 3/2013 | Platt et al. .................. 455/456.2 |
| 8,483,652 B2 * | 7/2013 | Hall .......................... 455/404.1 |
| 8,489,669 B2 * | 7/2013 | Johnson ...................... 709/203 |
| 8,525,681 B2 * | 9/2013 | Gehrke et al. ............. 340/573.4 |
| 8,559,980 B2 * | 10/2013 | Pujol .......................... 455/456.3 |
| 8,682,300 B2 * | 3/2014 | Stopel et al. ................ 455/414.1 |
| 2002/0037735 A1 | 3/2002 | Maggenti |
| 2002/0052214 A1 | 5/2002 | Maggenti |
| 2002/0061760 A1 | 5/2002 | Maggenti |
| 2002/0069529 A1 | 6/2002 | Wieres |
| 2002/0102999 A1 | 8/2002 | Maggenti |
| 2002/0112047 A1 | 8/2002 | Kushwaha |
| 2002/0135504 A1 | 9/2002 | Singer |
| 2002/0173317 A1 | 11/2002 | Nykanen |
| 2002/0198632 A1 | 12/2002 | Breed |
| 2003/0009602 A1 | 1/2003 | Jacobs |
| 2003/0037163 A1 | 2/2003 | Kitada |
| 2003/0065788 A1 | 4/2003 | Salomaki |
| 2003/0078064 A1 | 4/2003 | Chan |
| 2003/0081557 A1 | 5/2003 | Mettala |
| 2003/0101329 A1 | 5/2003 | Lahti |
| 2003/0101341 A1 | 5/2003 | Kettler |
| 2003/0103484 A1 | 6/2003 | Oommen |
| 2003/0114157 A1 | 6/2003 | Spitz |
| 2003/0119528 A1 | 6/2003 | Pew |
| 2003/0134648 A1 * | 7/2003 | Reed et al. ................... 455/456 |
| 2003/0153340 A1 | 8/2003 | Crockett |
| 2003/0153341 A1 | 8/2003 | Crockett |

(56) References Cited

U.S. PATENT DOCUMENTS

| | | |
|---|---|---|
| 2003/0153342 A1 | 8/2003 | Crockett |
| 2003/0153343 A1 | 8/2003 | Crockett |
| 2003/0161298 A1 | 8/2003 | Bergman |
| 2003/0204640 A1 | 10/2003 | Sahinoja |
| 2003/0223381 A1 | 12/2003 | Schroderus |
| 2004/0002326 A1 | 1/2004 | Maher |
| 2004/0044623 A1 | 3/2004 | Wake |
| 2004/0046667 A1 | 3/2004 | Copley |
| 2004/0064550 A1 | 4/2004 | Sakata |
| 2004/0068724 A1 | 4/2004 | Gardner |
| 2004/0090121 A1 | 5/2004 | Simonds |
| 2004/0204806 A1 | 10/2004 | Chen |
| 2004/0205151 A1 | 10/2004 | Sprigg |
| 2004/0229632 A1 | 11/2004 | Flynn |
| 2005/0003797 A1 | 1/2005 | Baldwin |
| 2005/0028034 A1 | 2/2005 | Gantman |
| 2005/0039178 A1 | 2/2005 | Marolia |
| 2005/0041578 A1 | 2/2005 | Huotari |
| 2005/0086340 A1 | 4/2005 | Kang |
| 2005/0086467 A1 | 4/2005 | Asokan |
| 2005/0112030 A1 | 5/2005 | Gauss |
| 2005/0136895 A1 | 6/2005 | Thenthiruperai |
| 2005/0172217 A1 | 8/2005 | Leung |
| 2005/0174987 A1 | 8/2005 | Raghav |
| 2005/0209995 A1 | 9/2005 | Aksu |
| 2005/0246217 A1 | 11/2005 | Horn |
| 2005/0259675 A1 | 11/2005 | Tuohino |
| 2006/0053225 A1 | 3/2006 | Poikleska |
| 2006/0058045 A1 | 3/2006 | Nilsen |
| 2006/0058948 A1* | 3/2006 | Blass et al. ............ 701/207 |
| 2006/0074618 A1 | 4/2006 | Miller |
| 2006/0090136 A1 | 4/2006 | Miller |
| 2006/0097866 A1 | 5/2006 | Adamczyk et al. |
| 2006/0132349 A1 | 6/2006 | Stern |
| 2006/0212558 A1 | 9/2006 | Sahinoja |
| 2006/0212562 A1 | 9/2006 | Kushwaha |
| 2006/0234639 A1 | 10/2006 | Kushwaha |
| 2006/0234698 A1 | 10/2006 | Folk |
| 2007/0026854 A1 | 2/2007 | Nath |
| 2007/0030539 A1 | 2/2007 | Nath |
| 2007/0030973 A1 | 2/2007 | Mikan |
| 2007/0207797 A1 | 9/2007 | Pitt |
| 2008/0032703 A1* | 2/2008 | Krumm et al. ............ 455/456.1 |
| 2008/0081641 A1* | 4/2008 | Smith et al. ............ 455/456.3 |
| 2008/0227467 A1* | 9/2008 | Barnes et al. ............ 455/456.2 |
| 2009/0015461 A1 | 1/2009 | Pitt |
| 2009/0079614 A1 | 3/2009 | Pitt |
| 2010/0214148 A1 | 8/2010 | Kuhn |
| 2010/0214149 A1 | 8/2010 | Kuhn |
| 2010/0238065 A1 | 9/2010 | Pitt |

OTHER PUBLICATIONS

Search Report received in European Appl. No. 07751688.8 dated Oct. 22, 2012.

* cited by examiner

LOCATION BASED GEO-REMINDERS

The present invention claims priority from U.S. Provisional Application 61/136,917, filed Oct. 14, 2008, entitled "LOCATION BASED GEO-REMINDERS", to GEHRKE et al., the entirety of which is expressly incorporated herein by reference.

BACKGROUND OF THE INVENTION

1. Field of the Invention

This invention relates generally to wireless communications. More particularly, it relates to location based services (LBS) and short messaging system (SMS) messaging.

2. Background

Personal data assistants and smart phones are becoming increasingly popular. Part of the appeal of such devices is the ability to execute applications that do a myriad of functions. Once of those functions is a reminder reminder function that can be programmed through an appropriate application. Users can program an appropriate application to provide an reminder in advance of a given event. For instance, a user can program their device to provide an reminder of a doctor's visit the following day, to provide an reminder that a bill is due within a few days, to provide an reminder that it is time to go to a business meeting, to provide an reminder that a library book is due for return, to provide an reminder that dry cleaning is ready for pick-up, etc.

Although time based reminders are known within the art, there is a need for a method and apparatus that allows for tying an reminder to a current location of a wireless user. This would provide an reminder when a user is at a location to address such an reminder.

SUMMARY OF THE INVENTION

In accordance with the principles of the present invention, a method of location based geo-reminders retrieves, from a location based geo-reminder physical server, a current location of a particular wireless client device within a given area. The method accesses, from the location based geo-reminder physical server, a physical location based geo-reminder database comprising an identity of a trigger identifier and a limits of trigger identifier. Transmission of a location based geo-reminder message is initiated if the current location of the particular wireless client device is within a limits of restriction distance from a location of the identity of the trigger.

In accordance with another aspect of the invention, a location based geo-reminder server includes a location access module to retrieve, from the location based geo-reminder physical server, a current location of a particular wireless client device within a given area. A location based geo-reminder database access module accesses, from the location based geo-reminder physical server, a physical location based geo-reminder database comprising an identity of a trigger identifier and a limits of trigger identifier. A location based geo-reminder module initiates generation of a location based geo-reminder message if the current location of the particular wireless client device is within a limits of trigger distance from a location of the identity of the trigger identifier.

BRIEF DESCRIPTION OF THE DRAWINGS

Features and advantages of the present invention will become apparent to those skilled in the art from the following description with reference to the drawings.

DETAILED DESCRIPTION OF ILLUSTRATIVE EMBODIMENTS

Figure 1:
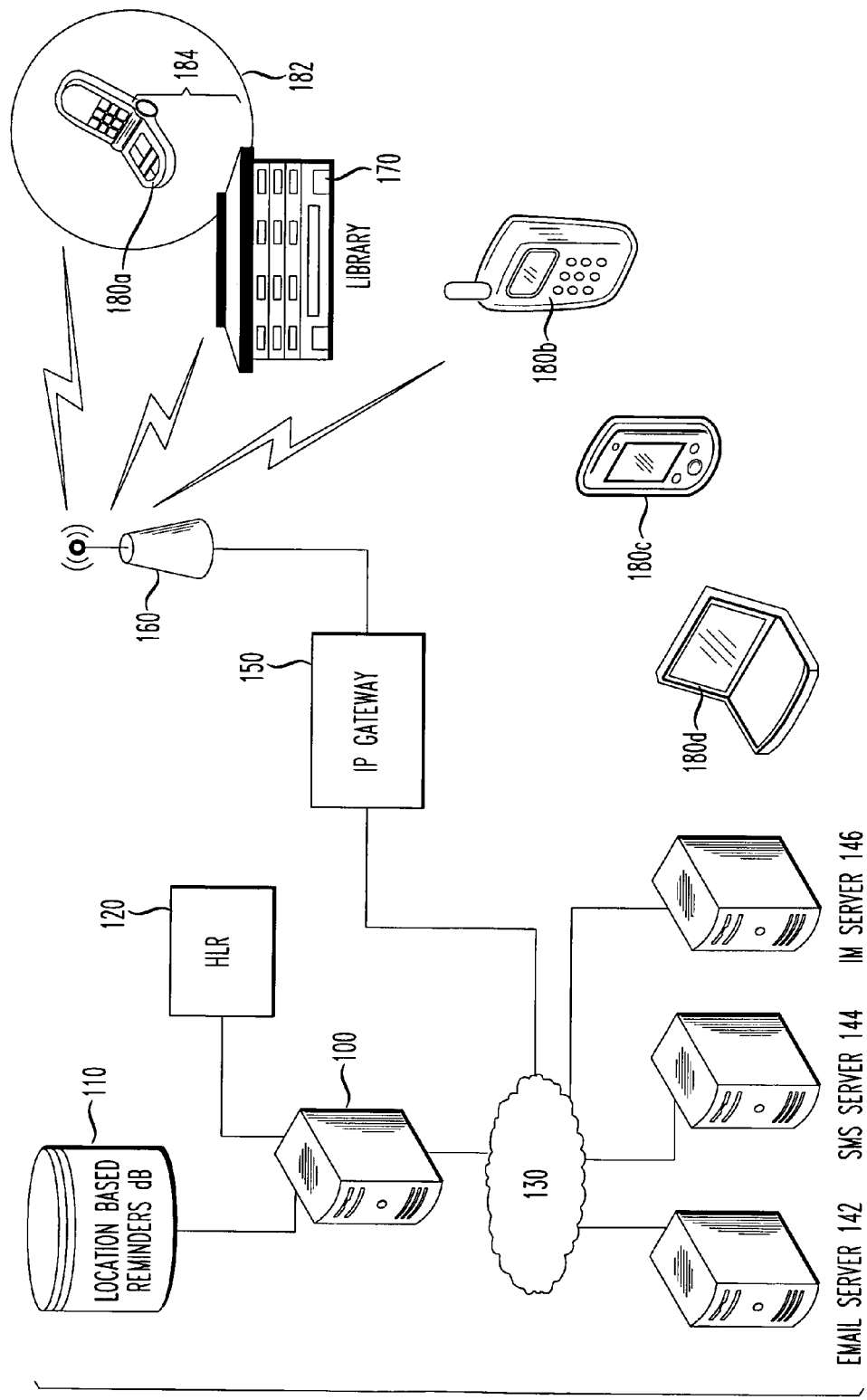
FIG. 1 shows a location based geo-reminder system, in accordance with the principles of the present invention.

Existing technology relies on use of time-based tasks in a personal digital assistant (PDA) or similar device. Location based geo-reminders, or "Geo-reminders", in accordance with the principles of the present invention add a location component to a task to be done when a subscriber is in a specified area.

Location-based reminders do not exist. Rather, conventional devices require a user to rely on memory or a scheduled reminder, which may be triggered based on a given time or date. But the present inventors have appreciated that the user might not be in the vicinity of a relevant location at the time that the reminder is issued to execute a given task.

Carrier customers currently must depend on visual cues or calendar-based based methods (e.g., memory, Post-it Notes, or calendar reminders) to remember to complete a task such as picking up their cleaning, scheduling a dentist appointment, stopping for groceries, or returning a book to the library.

The present invention provides location based geo-reminders, i.e., "Geo-reminders". Geo-reminders allow a user to set up reminders to send an SMS to their cell phone when they are in the vicinity of a pre-defined location. Preferably, the distance defined by 'vicinity' with respect to the present invention is configurable, either by a system administrator or customized by the user.

For example, when a user is within one mile of the public library on Third and Pine, between the hours of 8:00 a.m. and 7:00 p.m., Monday thru Saturday, he or she will be sent a reminder to return checked out books.

The present invention uses both a web-based and a handset based interface for provisioning reminders.

Preferably, the interface allows a user to search by address and drop a reminder "pin" on a displayable map. This reminder "pin" preferably has attributes such as vicinity radius, and reminder text to be provided to the user, e.g., by SMS, IM, or similar messaging technology.

The reminder pin also preferably includes criteria, such as time of day, and day, that control the sending of an SMS or other reminder message. When a reminder is submitted, the solution will flag the cell site equipment that is in the vicinity of the pin. Any time your phone interacts with the cell site equipment the system will send a SMS to your cell phone with the reminder.

For example, the reminder to be sent might relate to the next time the user is within one mile of the public library on Third and Pine, between the hours of 8:00 a.m. and 7:00 p.m, Monday thru Saturday, remind me to return the books I have checked out.

Alternatively, and importantly, the geo-reminder allows a sender to remind another user based on a location and time. For instance, a husband or other pre-authorized sender might access an appropriate web page, or send an appropriate message instruction to a service provider, to establish a geo-reminder in another user's device. As an example, the husband might send a geo-reminder to his wife that when they get within two blocks of the grocery store on her way home to send her a message reminder (e.g., SMS, IM, etc.) to pick up some milk.

Using the present invention, users no longer need to rely on their memories or scheduled reminders. Instead, reminders are triggered not only based on time (or timeless), but importantly based on location, e.g., when the user is in the proximity of a task they are to complete.

The invention has particular relevance and use with a cell phone or personal digital assistant (PDA).

For instance, FIG. 1 shows a location based geo-reminder system, in accordance with the principles of the present invention.

In particular, the location based geo-reminder (LBGR) system 101 disclosed herein, can include a LBGR server 100, a location based geo-reminder database 110, a home location register (HLR) 120, a communication network 130, various messaging servers 142-146, a gateway 150, and a cellular tower 160. The LBGR system 101 disclosed herein can further include various wireless clients (WCs), such as in particular a cellular telephone 180a, a smart phone 180b, a personal data assistant 180c, and a laptop computer 180d (collectively and individually described herein as wireless client(s) 180).

LBGR server 100 provides the backbone for location monitoring and message remindering functions disclosed herein. In particular LBGR server 100 can access location based geo-reminder database 110 for parameters with which to base WC 180 monitoring, as well as limitations that dictate when a location based geo-reminder message is to be issued in the event that a WC 180 is in proximity to a particular location and/or another WC 180.

LBGR server 100 can access a location service, such as HLR 120. Each time a WC 180 registers call-routing information in HLR 120, the LBGR 100 can use a pre-set proximity value retrieved from location based geo-reminder database 110 to create a proximity-list of WCs 180 that are within a pre-defined distance, as defined in location based geo-reminder database 110. This LBGR system 101 then preferably compares the registered call-routing information for WC 180a with the proximity-list. If the registered WC's 180 call-routing is in the proximity-list, the PBPA 100 system then sends an appropriate location based reminder message (e.g., SMS, IM, etc.) to WC 180a remindering them to that they are in a vicinity of a pre-designated location or WC 180.

When a geo-reminder message is submitted by LBGR server 100, the cell tower 160 that is in the vicinity of an identity of a trigger, e.g., library pin 320, is flagged. Any time a WC 180 interacts with the flagged cell tower 160 the LBGR server 100 can send a geo-reminder message, e.g., SMS, to a WC 180.

Communication network 130 can be any digital communication network that allows LBGR server 100 to send an appropriate location based geo-reminder message. Communication network 130 is preferably an open IP based communication network, such as the Internet. Alternately, communication network 130 can be a closed IP based communication network, relying on locally assigned IP addresses. Irrespectively of the type of communication network 130 used, LPBA server 100 can communicate with any of a variety of messaging servers, such as e-mail server 142, Short Message Service (SMS) server 144, Instant Message (IM) server 146, etc. through IP packet addressing, as is known within the art.

Gateway 150 provides gateway functions to allow communication network 130 to send and receive digital data packets to and from cellular network 160. Cellular network 160 transits an appropriate location based geo-reminder message from any of e-mail server 142, Short Message Service (SMS) server 144, Instant Message (IM) server 146, etc. to a pre-designated WC 180 over communication network 130.

For example purposes only, WC 180a is shown as having an entry in the location based geo-reminder database 110. However, any number of WCs 180 can have simultaneously entries in the restraining order database 110. WC 180a is shown as having an entry in the location based geo-reminder database 110 that corresponds to the radius distance 184. The radius distance 184 can be a distance measured in any unit of measurement that allows for triggering of a location based geo-reminder message when a WC 180 is in a vicinity of a pre-designated WC 180 or geographic location. Radius distance 184 from WC 180a produces a reminder zone 182 around WC 180a.

In the example shown, WC 180a will receive a geo-reminder message associated with the pre-designated library 170. If LBGR server 100 determines that a library 170 is within radius distance 184 from WC 180a, LPBA server 100 triggers transmission of an appropriate location based geo-reminder message. As shown in more detail in FIG. 2, the specific type of location based geo-reminder message can be specified as an entry in the location based geo-reminder database 110.

Radius distance 184 is described above as producing a reminder zone 182 that when breached, e.g., by library 170, triggers an appropriate location based geo-reminder message. However, in an alternate embodiment radius distance 184 can be a reminder zone that when breached by another WC 180 will cause trigger of an appropriate location based geo-reminder message. In this type of embodiment, if WC 180a is the subject of a reminder message when another WC 180 comes within a pre-determined distance from WC 180a, an appropriate location based geo-reminder message will be transmitted to pre-designated messaging system, as defined in a location based geo-reminder database entry 200, shown in detail in FIG. 2.

Location based geo-reminder database 110 preferably is a highly secure database that requires encrypted and password protected access. Subscribers can be provided remote access to the location based geo-reminder database 110 through a secure digital connection. A web page can be used to populate the entries within the location based geo-reminder database 110, as well as review and correct the entries within the location based geo-reminder database 110. Although location based geo-reminder database 110 is shown as being accessible through communication network 130, within the principles disclosed herein location based geo-reminder database 110 can be integrated with the LBGR server 100.

Although the LBGR system 101 disclosed herein relies on access to a HLR to monitor the location of WCs 180, any of a number of location services can be employed to determine the location of WCs 180. Global Positioning System (GPS) is becoming commonly integrated in WCs 180 and can be used to directly provide location information for a WC 180 to LBGR server 100. Alternately, within the principles disclosed herein, cellular triangulation, signal strength monitoring, etc. can be used to provide location information for WCs 180 to LBGR server 100.

Figure 2:
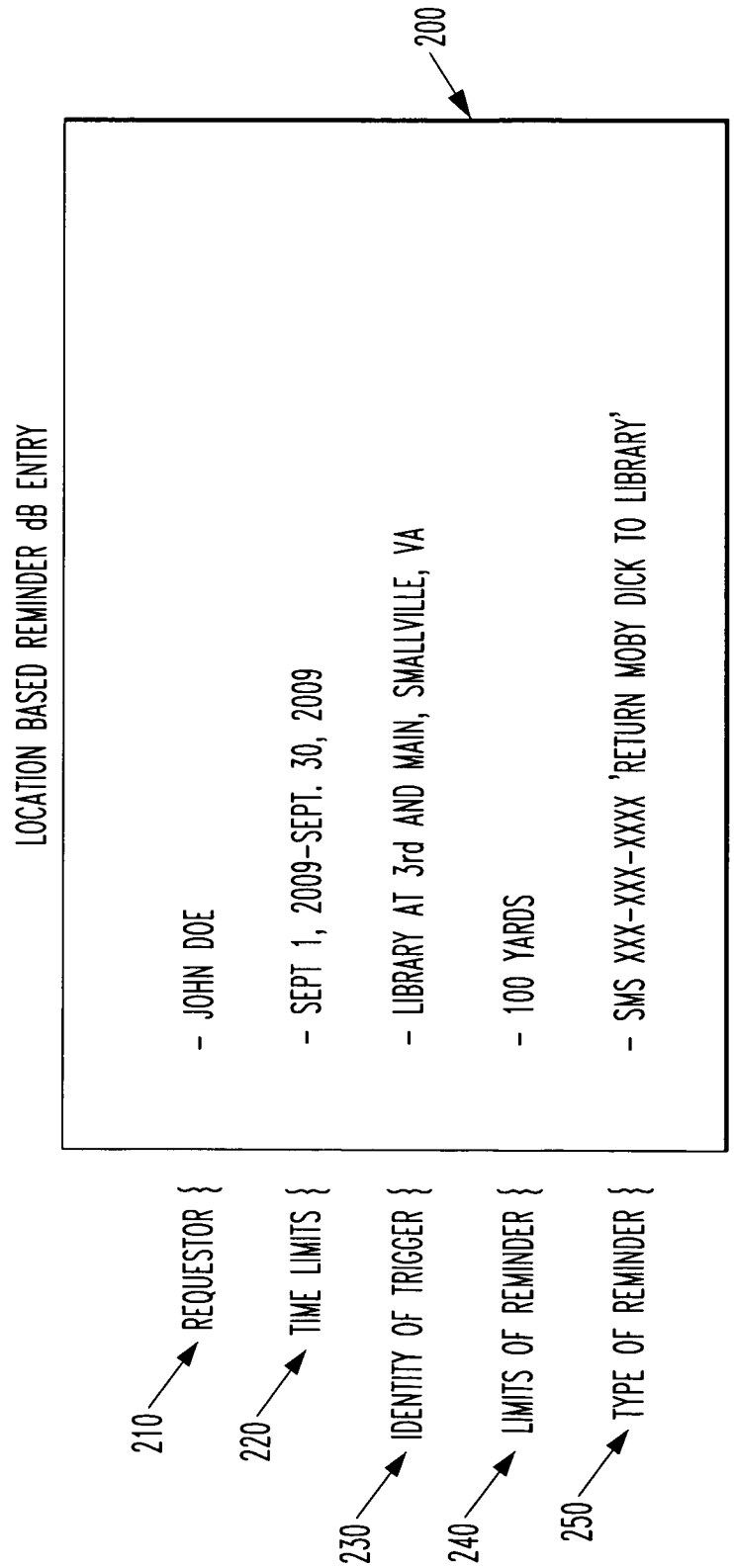
FIG. 2 shows an example entry in the location based geo-reminder database shown in FIG. 1, in accordance with the principles of the present invention.

FIG. 2 shows an example entry 200 in the location based geo-reminder database 110 shown in FIG. 1, in accordance with the principles of the present invention.

In particular, entry 200 can include a requestor field 210, a time limits field 220, an identity of trigger field 230, limits of reminder field 240, and type of reminder field 250.

The example requestor field 210 is shown as being "John Doe". However, the requestor field 210 can include anyone that has access to location based geo-reminders database 110. The requestor filed's 210 value can be transmitted to a WC 180 to convey who initiated a geo-reminder message.

The example time limits field 220 is shown as being "Sep. 1, 2009-Sep. 30, 2009". However, the time limits field 220 can include specific times of a day, specific days of the week, specific months of the year, and even years of enforcement, all in accordance within the principles disclosed herein. For example, a subscriber of a WC 180 may only desire to have reminders issued during work hours for work related reminders, during non-work hours for non-work related reminders, during weekends when running errands, during evening commute times, etc. Depending upon the desires of a subscriber of a WC 180, the time limits field 220 can specify any time period the subscriber desires a location based geo-reminder message to be issued.

The example identity of trigger field 230 is shown as being "Library at $3^{rd}$ and Main, Smallville, Va." However, in accordance with the principles disclosed herein the identity of trigger field 230 can include other WCs 180, telephone numbers, specific longitude(s) and latitude(s), ranges of longitudes and latitudes, names of geographic places that can be cross-referenced to their geographic locations, etc. The other WCs 180 can be identified by a MIN, telephone number, a name that is associated with a MIN and/or telephone number, etc.

The limits of reminder field 240 is shown as being "100 yards". However, in accordance with the principles disclosed herein the limits of reminder field 240 can be a zero value requiring direct contact with the identity of the value associated with the identity of trigger field 230, can be a measurement in miles, a city limits value, a state value, etc.

The type of reminder field 250 is shown as being "SMS XXX-XXX-XXXX 'Return Moby Dick to Library'". However, in accordance with the principles disclosed herein the type of reminder field 250 can designate e-mail and an e-mail address, can designate IM and an IM address, can designate any desired telephone number to call, etc. Preferably, if LBGR server 100 dials a telephone number to provide an reminder of a location based geo-reminder, a pre-recorded geo-reminder message is played. Likewise, if LBGR server 100 transmits a geo-reminder message, the WC 180 can further be provided with an option to obtain directions to the geographic location and/or WC 180 associated with the geo-reminder message.

Alternately, within the scope of the principles disclosed herein the type of reminder field 250 can designate a list of reminder messages to transmit. The LBGR server 100 can use the designated list of reminder messages to trigger transmission of a plurality of location based geo-reminder messages in response to a single location based geo-reminder trigger. The type of reminder filed 250 can even include a MIN to assist in reaching a WC 180 in the event an alternate designated fails to reach the WC 180.

Figure 3:
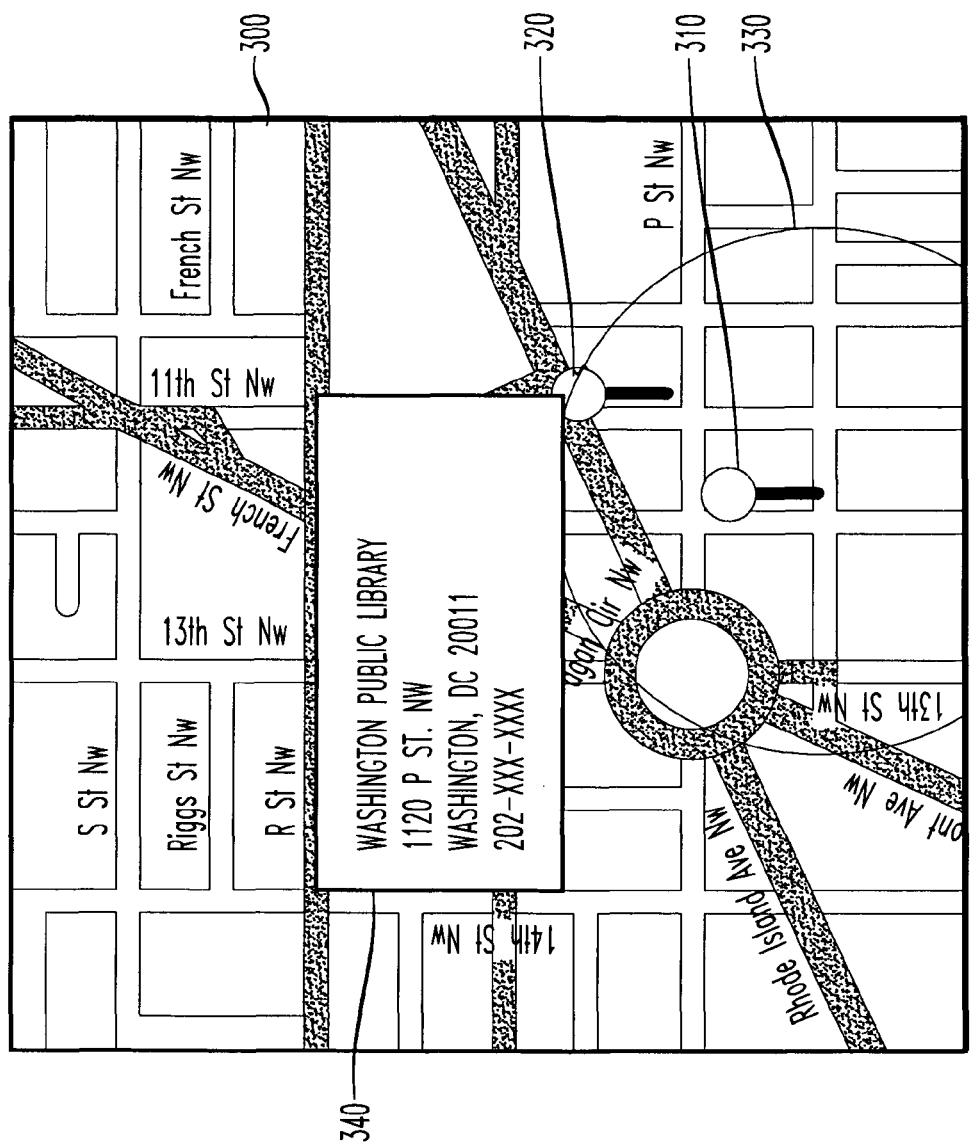
FIG. 3 shows an example map graphic displaying pins for a wireless device and information associated with a reminder reminder target, in accordance with the principles of the present invention.

FIG. 3 shows an example map graphic displaying pins for a wireless device and information associated with a reminder reminder target, in accordance with the principles of the present invention.

In particular, the example map graphic 300 includes a WC pin 310, a library pin 320, a radius distance graphic 330, and a library information overlay 340.

WC pin 310 preferably is a moving pin whose position is continuously updated on map graphic 300, and other map graphics not shown. Surrounding WC pin 310 is a radius distance graphic 330. Preferably radius distance graphic 330 is continuous updated on map graphic 300, and other map graphics not shown, to display a reminder zone. Multiple radius distance graphics 330 can be displayed for a single WC pin 310 to provide an indication to a user of a WC 180 that they have multiple location based geo-reminders pre-configured. The radius distance 184 value used to size the radius distance graphic 330 is retrieved from an entry in location based geo-reminders database 110.

Radius distance graphic 330 can be viewable only when a WC 180 comes within a pre-designated distance from a pre-designated target. Alternately, radius distance graphic 330 can be visible continuously during display of map graphic 300.

Library pin 320 provides a visual representation of a pre-configured reminder entry from the location based geo-reminders database 110. The library pin's 320 location is preferably shown relative to the current location of a WC 180, shown as WC pin 310.

Either by user selection, automatically initiated when a WC 180 comes within radius distance 184, or viewable at all times library pin 320 is viewable, library information overlay 340 provides information related to library pin 320. The information shown as populating library information overlay 340 can be sourced from any combination of information entered by a user of a WC 180 establishing a location based geo-reminder in accordance with the principles disclosed herein, a mapping database having metadata associated with specific addresses, an Internet mapping service that provides mapping services, such as Mapquest and Google Maps, etc.

Whichever information source provides the information needed to populate the library information overlay 320, preferably a user of a WC 180 can configure the specific type of information displayed in the library information overlay 340. For example, a particular user of a WC 180 may only desire a telephone number to be displayed in library information overlay 320. An additional field within the location based geo-reminder database entry 200 can store configuration information to control the type of information provided to a user of a WC 180 in library information overlay 320.

Figure 4:
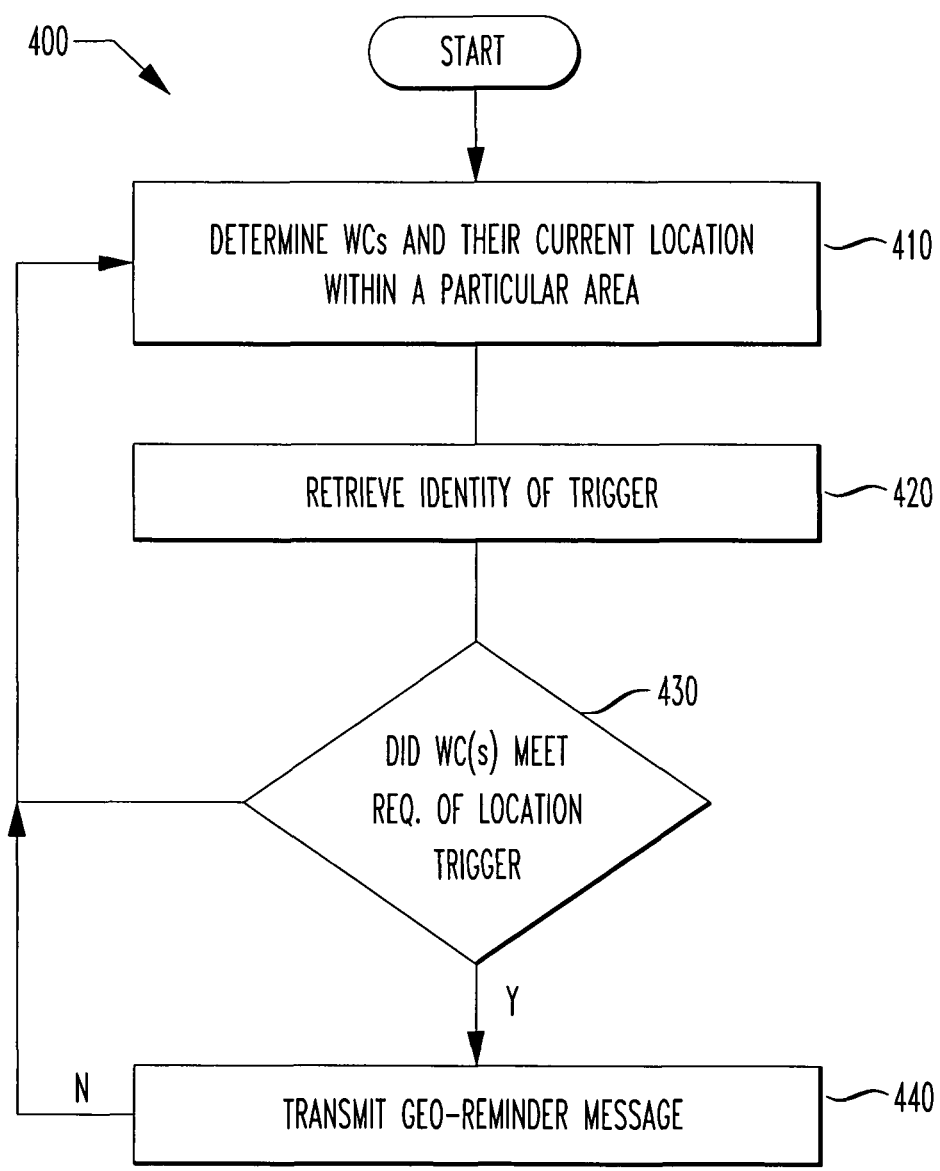
FIG. 4 shows an example flow chart for a process of triggering a location based geo-reminder message, in accordance with the principles of the present invention.

FIG. 4 shows an example flow chart for a process of triggering a location based geo-reminder message 400, in accordance with the principles of the present invention.

At step 410, a determination is made of which WC(s) 180 exist within in a particular area. LBGR server 100 can access a HLR 120 to retrieve a list of WCs 180 and their respective locations that have registered call-routing information in the HLR 120.

At step 420, a determination is made if any of the WCs 180 that were determined to be within a particular area in step 410 have an entry in the location based geo-reminder database 110. LBGR server 100 can use the list of WCs 180, e.g., MINs, that were determined to be within a particular area in step 310 as a database query issued to location based geo-reminder database 110. Any matched WCs 180 returned from the database query provides a list of WC(s) 180 that have pre-established location based geo-reminders and their respective restrictions.

At step 430, a decision is made if the WC(s) 180 that has pre-established location based geo-reminders are in a vicinity of a pre-configured geographic location or another WC 180.

LBGR server 100 can compare the current geographic location of the WC(s) 180 that have pre-established location based geo-reminders to the geographic location of the identity of the trigger, as retrieved from location based geo-reminder database 110. The identity of the trigger can be another WC 180 or geographic coordinates that correspond to, e.g., school, playground, daycare center, library, video rental store, etc.

If the result of the decision from step 430 is that a WC 180 is within a pre-determined distance from a pre-designated geographic location or another WC 180, step 430 branches to step 440. Otherwise, step 430 branches back to step 410 to continuously monitor for a location based geo-reminder.

At step 440, an appropriate location based geo-reminder message (e.g., SMS, IM, etc.) is transmitted to whatever reminder destination that is specified by the type of reminder field 250 in the location based geo-reminder database entry 200. The LBGR 100 server initiates transmission of an appropriate location based geo-reminder message to the type of reminder 250 destination that is associated with the WC(s) 180 that was determined to within a pre-designated vicinity of a pre-designated geographic location or another WC 180.

Step 440 branches back to the beginning of the process of triggering a location based geo-reminder message 400 to allow for continuous monitoring of location based geo-reminders, in accordance with the principles disclosed herein.

While the invention has been described with reference to the exemplary embodiments thereof, those skilled in the art will be able to make various modifications to the described embodiments of the invention without departing from the true spirit and scope of the invention.

What is claimed is:

1. A method of location based geo-reminders, comprising:
    accessing, from a location based geo-reminder physical server, a physical location based geo-reminder database comprising a trigger identifier identifying a user defined time at which a location based geo-reminder message regarding a user-defined task is to be transmitted; and
    triggering transmission at said user defined time of said location based geo-reminder message regarding a user-defined task, to a particular wireless client device when said particular wireless client device interacts with a cellular tower associated with said trigger identifier;
    wherein a limit of restriction is identified in at least one of: feet, a yard measurement, a longitude and latitude, and a miles measurement.

2. The method of location based geo-reminders according to claim 1, wherein said trigger identifier comprises:
    a mobile identification number (MIN).

3. The method of location based geo-reminders according to claim 1, wherein said trigger identifier comprises:
    a mobile telephone number.

4. The method of location based geo-reminders according to claim 1, wherein said location based geo-reminder message comprises:
    an email message.

5. A location based geo-reminder server, comprising:
    a location based geo-reminder database access module to access, from said location based geo-reminder physical server, a physical location based geo-reminder database comprising a trigger identifier identifying a user defined time at which a location based geo-reminder message regarding a user-defined task is to be transmitted; and
    a location based geo-reminder module to trigger transmission at said user defined time of said location based geo-reminder message regarding a user-defined task to a particular wireless client device when said particular wireless client device interacts with a cellular tower associated with said trigger identifier;
    wherein a limit of restriction is identified in at least one of: feet, a yard measurement, a longitude and latitude, and a miles measurement.

6. The location based geo-reminder server according to claim 5, wherein said trigger identifier comprises:
    a mobile identification number (MIN).

7. The location based geo-reminder server according to claim 5, wherein said trigger identifier comprises:
    a mobile telephone number.

8. The location based geo-reminder server according to claim 5, wherein said location based geo-reminder message comprises:
    an email message.

* * * * *